UNITED STATES PATENT OFFICE 2,590,067

METHANOL COMPLEX OF DEHYDRO-L-ASCORBIC ACID

Benjamin Pecherer, Montclair, N. J., assignor to Hoffmann-La Roche Inc., Nutley, N. J., a corporation of New Jersey No Drawing. Application May 10, 1950, Serial No. 161,259

1 Claim. (Cl. 260—344.5)

This invention relates to a new method for preparing dehydro-L-ascorbic acid.

Dehydro-L-ascorbic acid is a known compound having vitamin C activity. However, it cannot be purified by crystallization in view of its insolubility in neutral organic solvents. While it dissolves readily in basic solvents, such as pyridine, it cannot be recovered therefrom. It dissolves in water on warming to 60° C. but no solid separates on cooling the solution.

The present invention provides a new process for producing dehydro-L-ascorbic acid in large yields and in a high state of purity. According to the procedure of the present invention a dehydro-L-ascorbic acid-methanol complex, which is readily crystallizable, is first produced and then subjected to thermal decomposition, as by simple heating, to yield pure dehydro-L-ascorbic acid. The complex consists of dehydro-L-ascorbic acid combined in equimolecular proportions with methanol. It analyzes for the empirical formula $C_7H_{10}O_7$.

The dehydro-L-ascorbic acid-methanol complex is highly soluble in water even at temperatures as low as 0° C., whereas dehydro-L-ascorbic acid dissolves in water only on warming to 60° C. The complex is readily soluble in many solvents, e. g., lower alcohols, such as methanol, ethanol, isopropanol, n-butanol, and isoamyl alcohol; and in the case of a number of solvents, herein identified as crystallization solvents, it readily crystallizes therefrom upon cooling. Examples of such crystallization solvents are methyl acetate, ethyl acetate, isopropyl acetate, methyl isobutylketone, methyl ethylketone, methyl n-propylketone, and diethylketone. The dehydro-L-ascorbic acid-methanol complex melts at 102–105° C. In a freshly prepared methanol solution it had an optical rotation of $[\alpha]_D^{27} = +62°(c=1)$. The compound mutarotates with a final optical rotation of $[\alpha]_D^{27} = +38°$.

The dehydro-L-ascorbic acid-methanol complex can be obtained by crystallizing from a crystallization solvent the concentrate obtained by removing methanol from the reaction mixture resulting from the oxidation, for example, with a halogen, of L-ascorbic acid in the presence of methanol. More particularly, the concentrate is obtained by removing the bulk of the methanol from the reaction mixture until a syrup is produced. The concentrated reaction mixture or syrup is then dissolved in the crystallization solvent and the resulting solution cooled, whereupon crystallization of the dehydro-L-ascorbic acid-methanol complex takes place.

According to the present invention the process for producing dehydro-L-ascorbic acid in a highly purified form involves reacting L-ascorbic acid in substantially anhydrous methanol with a halogen, e. g., chlorine, bromine, or iodine in the presence of excess lead carbonate, at a temperature preferably not exceeding about 9° C., removing the lead salts formed and the excess lead carbonate, concentrating the residual reaction mixture to a syrup, dissolving the syrup in a crystallization solvent, cooling the resulting solution to crystallize the dehydro-L-ascorbic acid-methanol complex therefrom, recovering the crystalline complex from the solvent, and thermally decomposing the isolated crystalline dehydro-L-ascorbic acid-methanol complex per se, or in the presence of a solvent whose boiling point is above that of methanol, e. g., any of the hereinbefore mentioned lower alcohols, ketones and esters whose boiling points are higher than that of methanol.

Since hydrohalic acids are formed during the oxidation reaction with the halogens, the lead carbonate is employed in excess of that required to neutralize the hydrohalic acid formed. All of the lead carbonate should be present at the start of the reaction since it has been found that if the lead carbonate is added portion-wise from time to time during the reaction, a much diminished amount, if any, of dehydro-L-ascorbic acid is obtained. The temperature of the reaction may vary, but preferably should not exceed about 9° C., during the introduction of the halogen. Optimum yields are obtained when the temperature of the reaction with the halogens, particularly in the case of chlorine, is maintained within the range of about −10° to about −5° C. Any crystallization solvent, for example, those mentioned above can be employed to crystallize the dehydro-L-ascorbic acid-methanol complex. For this purpose methyl isobutylketone is particularly effective.

Because of its cheapness and ease of handling, chlorine is the preferred halogen employed. That gaseous chlorine can be utilized in the reaction is surprising since alcohols are normally attacked by gaseous chlorine, especially if moisture is present. Since water is formed during the reaction, it would be expected that the chlorine would attack the methanol as well as form hydrochloric acid which would adversely affect the yield of dehydro-L-ascorbic acid.

The following examples will serve to illustrate the invention:

Example 1

Chlorine gas was introduced into a stirred mixture containing 176 grams of L-ascorbic acid, 520 grams of lead carbonate and 1200 cc. of methanol, while maintaining the temperature at −10° C. to −5° C. In about 1½ hours one mole of chlorine (71 grams) was introduced. Frequent tests were made with a few drops of the reaction mixture on starch-potassium iodide paper after stopping the chlorine stream, to determine when an excess of chlorine was present.

Small amounts of L-ascorbic acid were added to react with any excess of chlorine. Usually not more than 1 to 4 grams of the L-ascorbic acid were required to reach the end point. The stirring was continued at below −6° C. for ½ hour after the end point was reached. The lead chloride which had formed and the excess lead carbonate were then filtered off through a diatomaceous filter aid, and the filter cake washed with three 150 cc. portions of absolute methanol cooled to −5° C. Through the clear colorless filtrate was passed a small amount of hydrogen sulfide to precipitate any dissolved lead salts as lead sulfide, and the excess hydrogen sulfide was removed by blowing air through the solution. Five grams of a diatomaceous filter aid were added, the suspension was filtered through a thin layer of the diatomaceous filter aid, and the filter cake was washed with a small amount of methanol. The methanol was then removed from the clear filtrate by evaporation at about 40° C. under vacuum. When the bulk of the methanol had been removed the colorless syrup slowly became a pale green color.

To the pale green syrup were added 300 cc. of methyl isobutylketone and the mixture was stirred until the syrup had dissolved. On chilling, the solution set to a mass of flat narrow platelets. After standing 16 hours at 4° C., the crystals were filtered off and washed with cold methyl isobutylketone. There was thus obtained the dehydro-L-ascorbic acid-methanol complex consisting of dehydro-L-ascorbic acid combined in equimolecular proportions with methanol.

In a round bottom flask provided with an outlet tube leading to a trap cooled in an acetone-solid carbon dioxide mixture, were placed 10.3 grams of the crystalline dehydro-L-ascorbic acid-methanol complex. The flask containing the complex was heated in an oil bath whose temperature was gradually increased. At about 100° C., a few droplets of liquid were condensed in the trap. At 102° C., the substance began to melt to a green syrup and active gas evolution commenced at 107° C., large amounts of liquid being condensed which was identified as methanol. The residue gradually turned to a pure white solid at 118° C. at which temperature no more liquid was condensed after 40 minutes. The cooled residue was crushed under anhydrous ethanol, filtered off and dried. The dehydro-L-ascorbic acid thus obtained melted at 223° C. (with decomposition).

In an alternative procedure, the dehydro-L-ascorbic acid-methanol complex was thermally decomposed in the presence of an organic solvent as follows:

416 grams of the dehydro-L-ascorbic acid-methanol complex and one litre of anhydrous isopropanol were placed in a round bottom flask equipped with a stirrer and a condenser set for downward distillation. The stirred solution was heated whereupon it began to deposit crystals. Slow distillation over the temperature range 65–80° C. was continued for a period of about 2½ hours. The flask with contents was then placed in a nice bath for two hours; then the crystalline material which had formed was filtered off, washed several times with isopropanol and then dried. Dehydro-L-ascorbic acid which melted at 225° C. (with decomposition) was thus obtained.

*Example 2*

Into a stirred suspension made up of 78 grams of L-ascorbic acid, 260 grams of lead carbonate and 600 cc. of methanol maintained at −7° C. to −5° C. there were added drop-wise 80 grams of bromine over a period of 40 minutes. Another 0.9 gram of L-ascorbic acid was added to react with the excess of bromine. The insoluble lead bromide which had formed and the excess lead carbonate were filtered off, and any dissolved lead bromide was precipitated as lead sulfide by passing hydrogen sulfide through the filtrate. Excess hydrogen sulfide was removed by blowing air through the solution and the precipitated lead sulfide filtered off. The methanol was then removed from the clear filtrate by evaporating at about 40° C. under vacuum. When the bulk of the methanol had been removed, the colorless syrup slowly became a pale green color.

To the pale green syrup were added 300 cc. of methyl isobutylketone. The syrup dissolved upon shaking and crystals began to appear at once. The mixture was then kept at about 4° C. for 16 hours. The crystals were filtered off and washed with dry ether and then dried, yielding the dehydro-L-ascorbic acid-methanol complex. The compound could then be subjected to thermal decomposition in the same manner as described in Example 1 to produce dehydro-L-ascorbic acid.

*Example 3*

To a mixture made up of 44 grams of L-ascorbic acid, 130 grams of lead carbonate and 200 cc. of absolute methanol maintained at a temperature of −7 to −5° C. there were added in portions while stirring, 62 grams of iodine over a period of 45 minutes. Stirring was continued for an additional 30 minutes and the reaction mixture was then filtered. The filter cake was washed with methanol at −5° C. A small amount of hydrogen sulfide was passed into the clear filtrate to convert any dissolved lead iodide into lead sulfide, and the lead sulfide formed was filtered off after removing the excess hydrogen sulfide by passing a brisk stream of air through the filtrate. The methanol was then removed from the clear filtrate by evaporation at about 40° C. under vacuum. When the bulk of the methanol had been removed, the colorless syrup slowly became a pale green color. To the pale green syrup was added 75 cc. of methyl isobutylketone and the mixture then kept at 4° C. for 72 hours. There was obtained a mass of crystals of the dehydro-L-ascorbic acid-methanol complex which were filtered off and washed with dry ether. Upon thermal decomposition in the same manner as described in Example 1, the crystals yielded dehydro-L-ascorbic acid.

While in the above examples methyl isobutylketone is used to crystallize the dehydro-L-ascorbic acid-methanol complex, there can also be employed in the same manner other crystallization solvents, e. g., methyl ethylketone, methyl n-propylketone, diethylketone, methyl acetate, ethyl acetate, and isopropyl acetate.

I claim:

The crystalline complex consisting of dehydro-L-ascorbic acid combined with methanol in equimolecular proportions.

BENJAMIN PECHERER.

REFERENCES CITED

The following references are of record in the file of this patent:

Kenyon, J. Chem. Soc. (London) 1948, 158–161.